July 30, 1957     E. M. SMITH     2,800,920
CHECK VALVE
Filed Nov. 20, 1952

Inventor
EDWARD M. SMITH
By Charles L. Lovercheck
Attorney

United States Patent Office 2,800,920
Patented July 30, 1957

2,800,920

CHECK VALVE

Edward M. Smith, Mansfield, Ohio, assignor to Techno Corporation, Erie, Pa., a corporation of Pennsylvania Application November 20, 1952, Serial No. 321,584

2 Claims. (Cl. 137—512.15)

This invention relates to check valves and more particularly to valves for use in pipe lines and conduits to allow fluid to flow in one direction and prevent the flow of fluid in the opposite direction.

An object of the invention is to provide a check valve which will offer very little resistance to flow in one direction but will completely stop flow of fluid in the opposite direction.

Another object of the invention is to provide a valve which will not chatter in operation.

Another object of the invention is to provide a valve which will be light in weight, simple in construction, economical to manufacture, and efficient in operation.

Another object of the invention is to provide a valve construction which is particularly adapted for use with fluid containing abrasive particles which would tend to wear away metallic parts but which would have little effect on rubber like materials.

With the foregoing and other objects in view, reference is made to the accompanying drawings, in which Fig. 1 is a perspective view of a pipe having certain parts broken away to show a valve arrangement mounted therein according to the invention;

Figure 7:
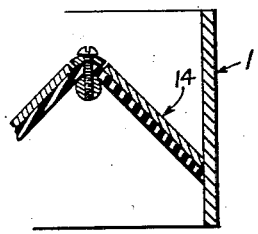
Fig. 7 is a transverse sectional view of the valve shown in Fig. 1.
Figure 1:
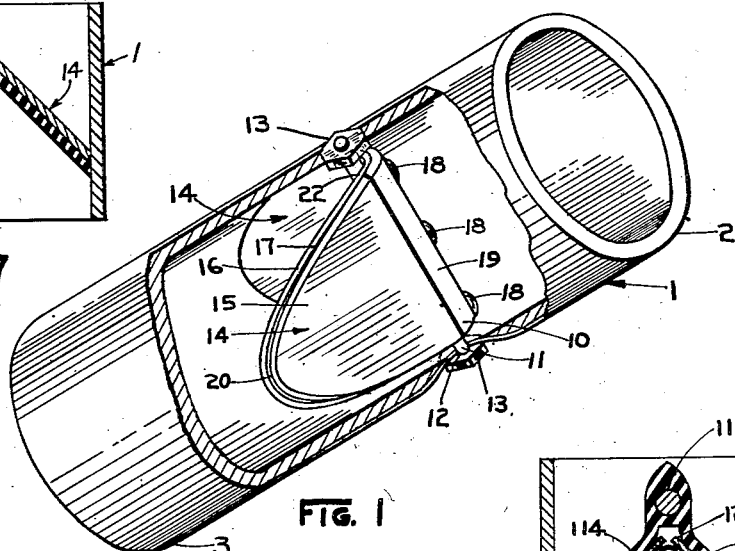

With more specific reference to the drawings, Fig. 1 shows a section of pipe 1 having a valve 10 mounted therein. The valve 10 is supported in the pipe 1 on center post 11. Center post 11 passes through holes 12 in pipe 1 and is secured in place by nuts 13 or other suitable securing means. Semi-elliptical wings 14 make up the operative part of the check valve. The wings 14 comprise metal plates 15 which are attached to resilient members 16 by bonding, cementing, or other well known means at 17. Resilient member 16 is attached to center post 11 by means of screws or rivets 18 which pass through plate 19 and resilient member 16 and are secured to center post 11.

Pipe 1 is preferably of the same diameter as the pipe line in which the check valve is to be installed. The ends 2 and 3 of the pipe may be threaded to accommodate couplings for attaching the pipe 1 into a pipe line or any other means of connecting the pipe 1 into a pipe line may be used such as welding, brazing, or by means of flanges or couplings.

Figure 6:
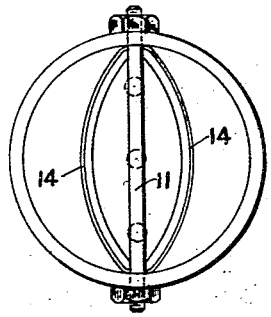
Fig. 6 is a bottom view of the embodiment of the invention shown in Fig. 1 with the valve in open position.

During normal operation, the ends 2 and 3 of pipe 1 are connected into a pipe line and the normal direction of flow of fluid through the pipe line is from end 2 to end 3. The force of the fluid flowing through the pipe will cause the semi-elliptical wings 14 to open so that when viewed from the end 3 of the pipe, the wings 14 and center post 11 appear as shown in Fig. 6.

Figure 5:
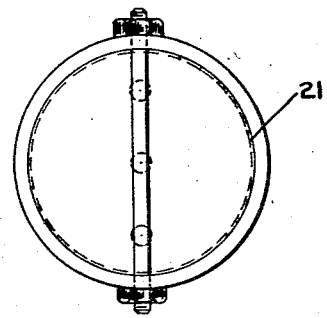
Fig. 5 is a top view of the embodiment of the invention shown in Fig. 1 showing the valve in closed position.

If the direction of flow of fluid through the pipe is reversed, the force of the fluid on the underside of the wings 14 will cause the wings to close and take the position shown in Fig. 5 when viewed from the end 3 of the pipe 1. It will be noted that the edges of the resilient members 16 extend beyond the edges of the metal plates 15 and engage the inside of the pipe 1 at 21 in such manner as to form a tight seal between the pipe 1 and the wings 14, thereby stopping all flow of fluid. The resilient material 16 forms a hinge at 22 between the center post 11 and the wings 14. The force of fluid flowing in the pipe from the end 2 to the end 3 when the wings 14 are in a closed position is exerted on the wings 14. The resilient members 16 are provided with reinforcing plate 15 to hold them in shape whereas if the wings were not provided with the reinforcing plates, they would not be suitable for use in a large pipe since they would collapse when they were closed and pressure was applied to them. In similar manner, the plate or saddle 19 cooperates with the portion of the resilient member adjacent it to hold that portion against collapsing.

Figure 2:
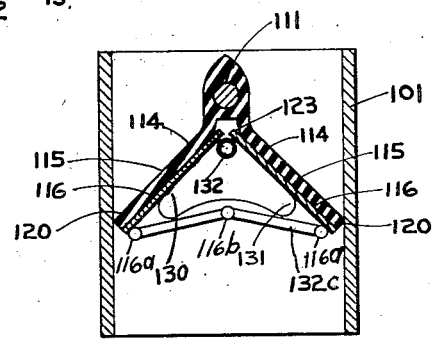
Fig. 2 is another embodiment of the valve according to the invention.

In the embodiment of the invention shown in Fig. 2, the wings 114 are supported similar to the manner in which center post 11 is supported in the embodiment shown in Fig. 1. Center post 111 is supported in pipe 101 and wings 114 are molded around center post 111. The wings 114 are provided with reinforcing plates 116 on the underside thereof and the reinforcing plates 116 are attached to the wings 114 by bonding, cementing, or other means. The reinforcing plates 116 extend beyond the contact point with the wings 114 at 123. This is done so that when the valve is in open position, the ends of the plate will reinforce the resilient material 115 but when closed, the material 115 can bend over a greater radius, thereby putting less strain on the material 115 at 123. The wings 114 are semi-elliptical in shape so that they may completely fill the pipe when the wings are in the closed position corresponding to that shown in Fig. 2. The edges 120 contact the inside edge of the pipe to form a nearly perfect seal therebetween while the reinforcing plates 116 form reinforcing members to hold the rubber like material 115 in shape.

An operating means 130 is provided which is made up of inflatable bag member 131 which is attached to the reinforcing members 116. The valve 132 which is adapted to be attached to a fluid line is provided for inflating the bag member. Toggle members 132c are pivoted to plates 116 at 116a and pivoted together at 116b. When bag 131 is deflated, the force of fluid flowing in pipe 101 forces wings 114 toward each other and pivot 116b on toggle links 132c moves toward center post 111, thereby collapsing container 131. When container 131 is inflated, it forces pivot 116b away from center post 111 to force wings 114 apart and to close the valve.

During normal operation, the links 132c tend to hold the wings 114 in open position. When it is desired to close the valve to the position shown in Fig. 2, air or other fluid is admitted through valve 132 to expand the bag 131, thereby moving wing members 114 to the position shown in Fig. 2.

Figures 3, 4:
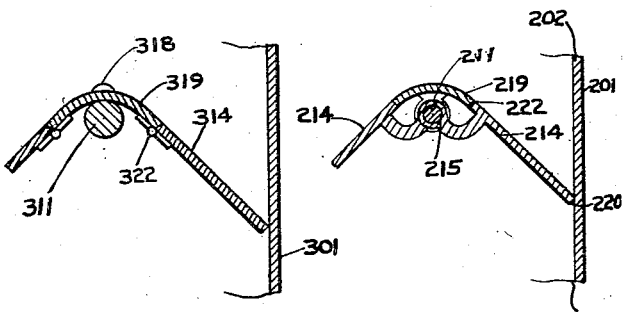
Fig. 3 is a third embodiment of the invention.
Fig. 4 is a further embodiment of the invention.

The embodiment of the invention shown in Fig. 4 is adapted for use under high temperature conditions. A pipe 201 is provided and center post 211 is supported on pipe 201 in a manner similar to the supporting of the post 11 in Fig. 1. Wings 214 are pivoted on center post 211 at 215 and are in engagement with plate 219 at 222.

Wings 214 are semi-elliptical to the shape similar to wings 14 in Fig. 1. The wings 214 and plate 219 may be made of metal, plastic, or any other material suitable to withstand high temperature. It will be seen that fluid flowing in the pipe 201 in the direction 202 to 203 will tend to pivot wings 214 about center post 211 to open the valve to allow fluid to flow while fluid flowing in the direction 203 to 202 will tend to close the valve and thereby stop the flow of the fluid.

The embodiment of the invention shown in Fig. 3 discloses another embodiment of the invention similar to the embodiment shown in Fig. 1. However, instead of a resilient member 16 forming a hinge as shown at 22, the hinge members 322 are provided which hingedly connect wing members 314 to plate member 319. The plate 319 is connected to center post 311 by means of rivets 318 and center post 311 is supported on pipe 301 in a manner similar to the manner in which center post 11 is supported on pipe 1 in Fig. 1. The operation of the check valve shown in Fig. 3 is similar to the operation of the check valve in Figs. 1, 2, and 4.

It will be apparent to those skilled in the art that I have provided a check valve which is suitable for use in large diameter pipes and I have disclosed how it may be operated from an external source and how it is adapted for handling abrasive materials and high temperature conditions.

The details of the structure disclosed herein may be varied substantially without departing from the spirit of the invention and exclusive use of novel structure in operation as described and coming within the scope of the claims is contemplated.

What I claim is:

1. A check valve comprising a hollow cylindrical body, a center post extending diametrically of said body and attached thereto at the ends of said center post, a resilient member comprising a sheet of resilient material on said center post, said resilient material being generally elliptical in shape, the edges thereof being adapted to lie against the inside edge of said cylindrical member continuously around the inner periphery thereof, a first rigid plate, two opposite ends of said plate engaging the inside periphery of said cylindrical member, means extending through said plate securing said resilient material to said center post, and wing members, each comprising a rigid plate, attached to said resilient member on each side of said first plate, said resilient member completely covering one side of said wing members and having a marginal edge protruding slightly beyond the edge of said wing members, one edge of each said wing member adapted to abut against an edge of said first plate, said wing members being generally semi-elliptical in shape, said wing members swinging into generally parallel proximate relation when the flow of fluid through said cylindrical member is in one direction, said wing members swinging outward into engagement with the inner periphery of said cylindrical member and with said first plate when the flow of fluid is in the opposite direction, said wing members being disposed on the side of said resilient member toward the incoming fluid when the flow is in said one direction, the edges of said resilient member being adapted to be forced into sealing engagement with the inner periphery of said cylindrical member by the pressure of fluid forcing said wing members to closed position.

2. The valve recited in claim 1 wherein said fastening means comprise bolts extending through said first plate, through said resilient member, and into said center post.

References Cited in the file of this patent

UNITED STATES PATENTS

| | | |
|---|---|---|
| 1,087,981 | Reynolds | Feb. 24, 1914 |
| 1,306,391 | Romanoff | June 10, 1919 |
| 1,393,204 | Daggett | Oct. 11, 1921 |
| 1,487,038 | Spencer | Mar. 18, 1924 |
| 1,708,907 | Spencer | Apr. 9, 1929 |
| 2,358,101 | Randall | Sept. 12, 1944 |